C. F. KNOWLTON & F. F. ELLIOTT.
MOLD MAKING MACHINE.
APPLICATION FILED MAY 8, 1911.

1,132,723.

Patented Mar. 23, 1915.
7 SHEETS—SHEET 1.

C. F. KNOWLTON & F. F. ELLIOTT.
MOLD MAKING MACHINE.
APPLICATION FILED MAY 8, 1911.

1,132,723.

Patented Mar. 23, 1915.
7 SHEETS—SHEET 5.

C. F. KNOWLTON & F. F. ELLIOTT.
MOLD MAKING MACHINE.
APPLICATION FILED MAY 8, 1911.

1,132,723. Patented Mar. 23, 1915.
7 SHEETS—SHEET 7.

UNITED STATES PATENT OFFICE.

CHARLES F. KNOWLTON AND FRANK F. ELLIOTT, OF PITTSBURGH, PENNSYLVANIA, ASSIGNORS TO THE OSBORN MANUFACTURING COMPANY, OF CLEVELAND, OHIO, A CORPORATION OF OHIO.

MOLD-MAKING MACHINE.

1,132,723.  Specification of Letters Patent.  Patented Mar. 23, 1915.

Application filed May 8, 1911. Serial No. 625,728.

*To all whom it may concern:*

Be it known that we, CHARLES F. KNOWLTON and FRANK F. ELLIOTT, citizens of the United States, and residents of Pittsburgh, county of Allegheny, State of Pennsylvania, have jointly invented a new and useful Improvement in Mold-Making Machines, of which the following is a specification, the principle of the invention being herein explained and the best mode in which we have contemplated applying that principle, so as to distinguish it from other inventions.

The present improved mold making machine may be regarded as a modification of the so-called roll-over type of machine which is characterized by having the frame, that carries the pattern plate, oscillatorily supported about a substantially central axis, in place of an axis to one side as in the familiar rock-over type of construction. The modification in question relates to the construction of the supports for said pattern plate, which are so arranged that they may be tilted from a normal vertical position to a substantially horizontal position and thus lower the mold, or flask containing the same, which is attached, of course, during the molding operation to the pattern plate carrier, down onto the floor, or such other support, independent of the machine, as it may be desired to utilize for the reception of the completed mold.

Other features of novelty are incidentally involved in the construction thus referred to, whereby this roll-over rock-down effect is secured, as also in the construction of the mechanism for withdrawing the pattern plate from the mold.

Said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 3:
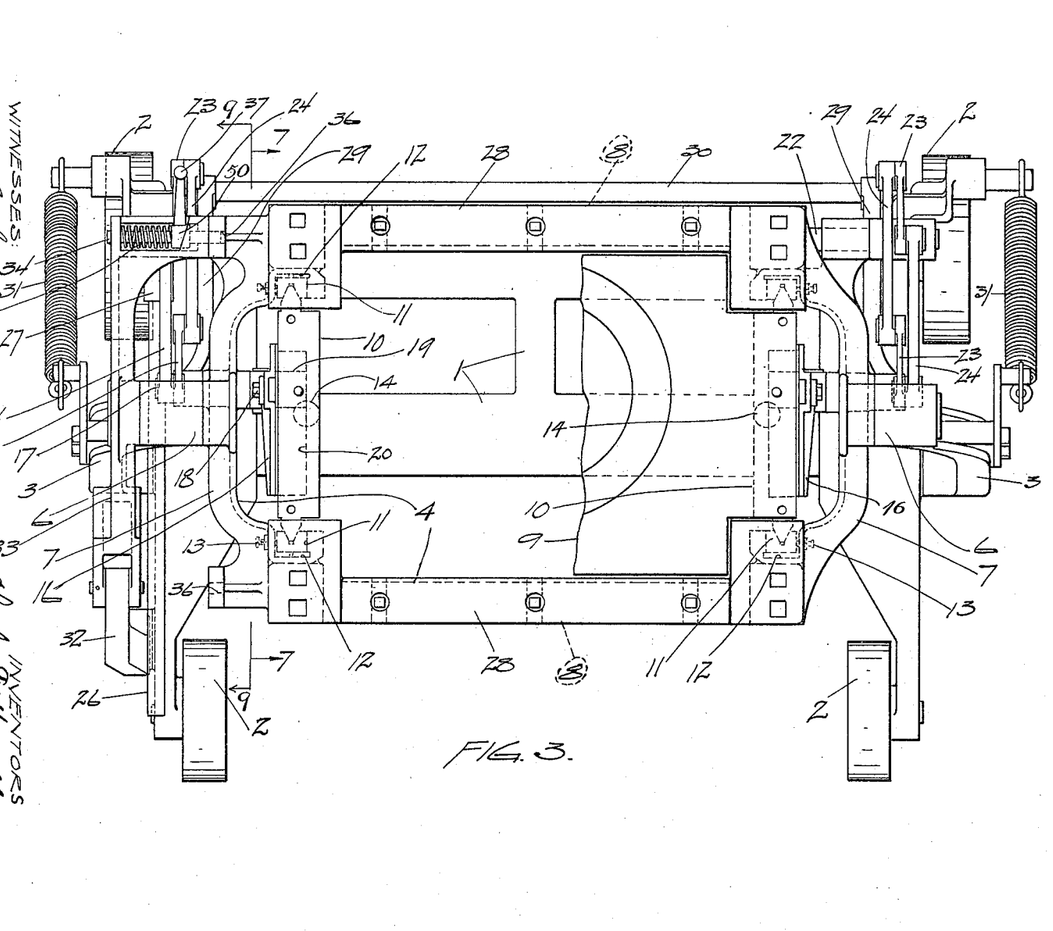
Fig. 3 is a plan view thereof, but omitting both the aforesaid flask, or mold-containing box, and also partially breaking away the pattern plate, in order not to obscure the operating mechanism proper.
Figure 8:
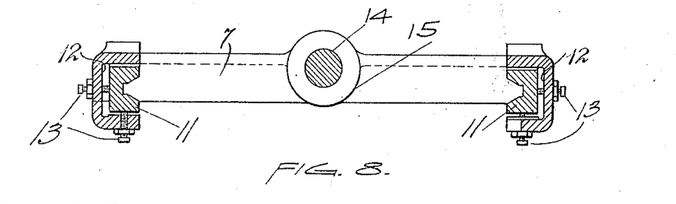
Fig. 8 is a horizontal section through one end of the pattern carrier frame as indicated by the line 8—8, Fig. 2.
Figure 9:
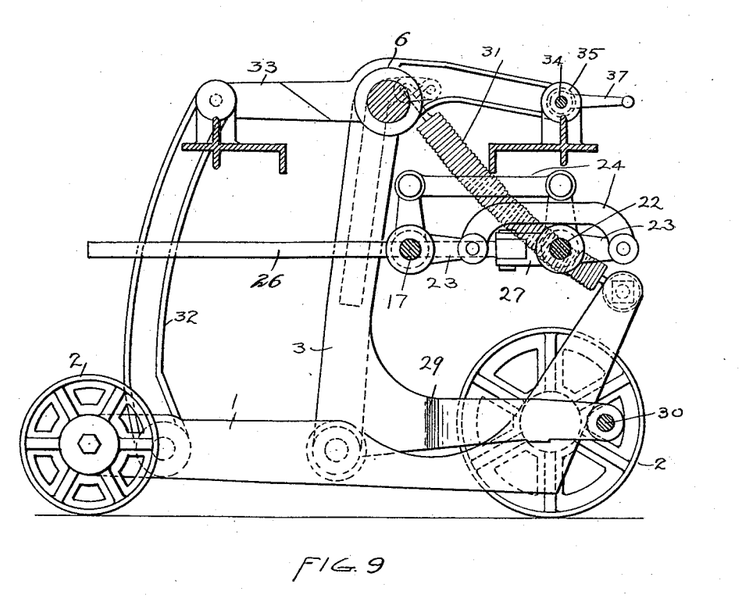
Fig. 9 is a view on the line 9—9 in Fig. 3.
Figure 10:
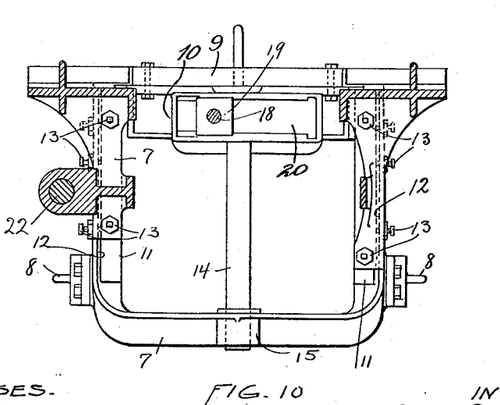
Fig. 10 is a view similar to Fig. 7 but showing the plate 16 removed.

The general form of the machine base 1 is best indicated in the plan view of Fig. 3; said base being preferably mounted upon wheels or rollers 2 in order to permit of the easy removal of the machine from one location to another. Pivoted on said base about a common axis is a pair of rocking arms 3 of sufficiently heavy construction to support the pattern carrying frame 4 together with the filled flask 5 which will weigh more or less depending upon its size and the form of the mold to be made therein. This frame is oscillatorily mounted between said arms about a horizontal axis parallel, of course, with the pivotal axis of the arms upon the base of the machine. Trunnion bearings 6 are preferably utilized in effecting such connection between the frame and the respective arms, the end members 7 of the frame, which are of the general rectangular form shown in the several side elevational views of the machine being provided with stub shafts for this purpose. These end members 7 are preferably made independently of the transverse connecting members 8 so that by the simple expedient of using transverse members of greater or less length, the desired size of pattern that is to be accommodated on any particular machine may be arranged for in the construction of said machine. Said transverse members obviously leave an open interior space in the frame in which the pattern plate 9 is designed to be movably supported. For thus supporting said plate, a carrier is provided consisting of two end members 10 slidably held in the respective end members 7 of the frame. The latter are formed with vertical guide-ways 11 for the purpose of thus holding the end members of said carrier which are adjustable in the fashion indicated in Figs. 3 and 8 for the purpose of taking up wear. As shown in the figures last referred to, the guide-ways consist of elongated strips set into slots, or grooves 12, in the frame ends, set screws 13 with suitable lock nuts serving to retain the said guide ways in desired position. In order to further steady the movement of the carrier each end member is also provided with a vertically extending central stem 14 that is fitted in a guide bearing 15 in the corresponding end member of the frame.

For vertically reciprocating the carrier in its holding frame, we prefer to employ mechanism of the same general construction as that described in U. S. Patent No. 982,971, dated January 31, 1911. Such mechanism in its present modified form comprises two similar crank plates 16 mounted, one at each end of the frame, on a suitable crank shaft 17. Each such crank plate is provided with an eccentrically disposed pin 18 that forms in effect a wrist pin for reciprocating the pattern plate carrier. This wrist pin is connected with the corresponding end-member of the carrier by being provided with a shuttle block 19 that is slidably held in a horizontally disposed slot or way 20 incorporated in the structure of said end member. In the upper position of the carrier, such block is designed to be thrown slightly over the center, or axis, of the plate 16 and operating shaft 17, so that the carrier will be securely retained in such position, movement of the plate being thus limited by an adjustable stop 21 secured in the slot wherein the block is thus slidably held.

In order to secure the simultaneous actuation of the cranks at both ends of the machine, a shaft 22 is journaled in the frame to one side of the carrier and is then connected at each of its ends with the corresponding crank-shaft 17 by means of bell-cranks 23 respectively mounted on such crank-shaft and the end of the adjacent operating shaft, and links 24, connecting corresponding arms of said bell cranks. A hand lever 26, removably held in a socket 27, on one end of the operating shaft, is provided for the use of the operator running the machine.

The operation of drawing is accomplished by rotating the handle 26 through a half revolution. This will rotate the cranks, and the action of the block 19 in the slot will move the plate either upwardly or downwardly, according to the direction of movement of the handle 26. An inspection of Figs. 7, 8, 9 and 10 will indicate clearly the operation of the different parts during the drawing operation.

The pattern plate 9 (Fig. 3) designed for use with our improved machine is mounted at each end upon the upper faces of the end members 10 of the carrier, regarding said carrier and holding frame as in their normal position. Said plate, however, is of such a width as to pass freely between the side members 8 of the frame, or rather between adjustable plates 28 secured upon the faces of the uppermost of said members, in the normal position of parts, so that when the flask is secured to the carrier a closure is formed therefor by the pattern plate, frame, and these plates taken together. In the inverted position of the frame, after the flask has been filled, said pattern plate, by reason of the foregoing construction, may be withdrawn from the sand in the flask without releasing the latter from the frame, as will be presently more fully set forth in describing the general operation of the machine.

Figure 4:
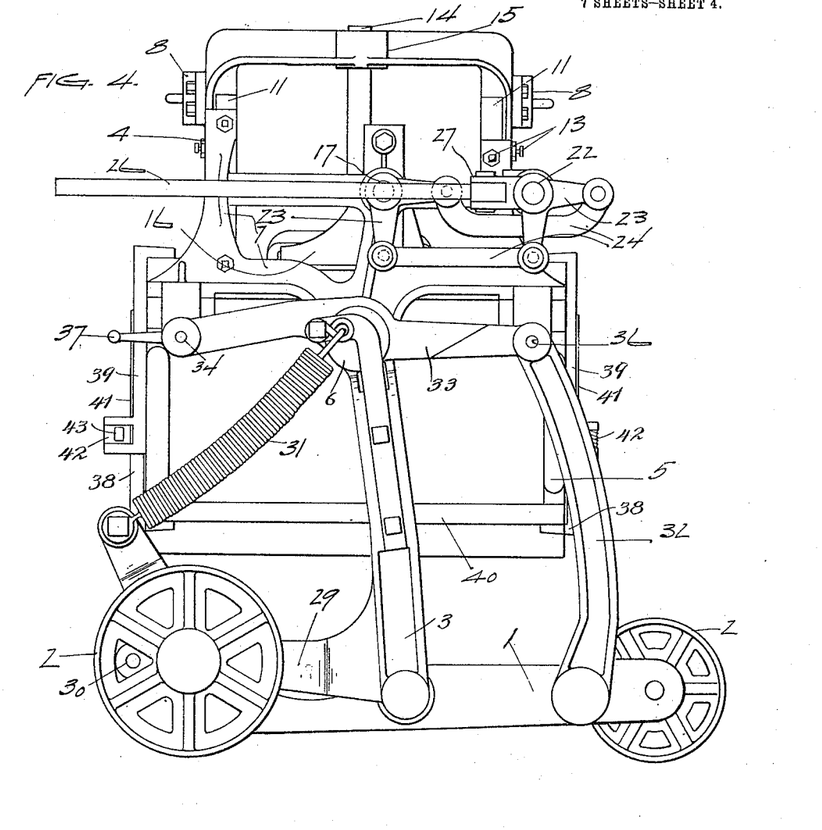
Fig. 4 is an end view of the machine corresponding to that of Fig. 1, but showing the pattern plate carrier in rolled-over, that is, inverted position relatively to that of said Fig. 1.

The pair of rocking arms, which it has been seen provide an oscillatory support for the frame 4 and pattern carrier held therein, are provided with rearwardly extending arms 29 that in the normal position of parts (see Fig. 1), as well as in the position of parts shown in Fig. 4, rest upon the machine base and serve to form of said rocking arms, a rigid support by reason of the location of the oscillatory axis of the frame somewhat to the rear of the axis of oscillation of said arms. These rearwardly extending stop-arms are furthermore connected by means of a transverse rod or bar 30, that provides a convenient handle for the operator to seize when he desires to rock the arms forwardly from their normal vertical position to the substantially horizontal position illustrated in Figs. 5 and 6. This forward tilting, or rock-down, movement is restrained by means of tension springs 31 connected with the upper ends of the respective rocking arms and with rearward extensions from the base, so that the operator is not required to put forth any particular exertion to make the descent of the flask onto the floor a gradual easy one.

It is of course desirable that such flask, or in other words the frame and pattern plate carrier, be maintained against movement about their common axis pending oscillation of the aforesaid rocking arms; that is, said flask should be held in horizontal, although inverted, position while it is thus being lowered onto the floor. To accomplish this end, a third rocking-arm 32, parallel with one of the aforesaid pair of arms 3, is provided, said arm 32 being pivotally connected at its lower end to the machine base and at its upper end to a transversely disposed member 33 journaled about the same trunnion axis 6 by which the adjacent end of the frame is connected with said rocking arm 3. Said arm extends beyond its connection with the trunnion to a point alined with the side of the frame 4 that holds the pattern plate carrier. In such end is reciprocably mounted a plunger bolt 34, normally urged forwardly by a spring 35 to engage with one or the other of two properly located apertures 36 in the corresponding end of said frame, and when thus engaging therewith to securely lock the same against rotation about its axis. Said plunger is moreover provided with a handle 37 that, upon being thrown upwardly, engages a cam edge 50 in its housing, thereby withdrawing bolt 34 as is necessary preparatory to rolling over the frame. This bolt it will be observed is adapted to lock the frame in either its normal or inverted position as may be desired, and when the frame is thus inverted and locked to said arm 33, the effect of the third rocking arm 32 will be to maintain said arm 33, and thus the frame 4, in a horizontal position pending oscillation of the rocking arms 3 that support the frame. The flask will thus be lowered in a horizontal position onto the floor.

While any suitable clamping means may be employed for securing the flask onto the frame that holds the pattern plate carrier, those illustrated in the several figures of the drawing, although not presented as a part of this invention, are preferred as lending themselves to ready adjustment for different depths of flask. As shown, said means comprise two members 38 and 39 slidably secured together and recurved or otherwise provided at their outer ends with suitable engaging elements whereby they may catch onto the side member of the frame and the bottom board 40 wherewith the flask 5 is closed after being filled with sand in the position illustrated in Fig. 1. One of the said clamp members is provided with a rack 41 while on the other is pivotally mounted a mutilated worm 42 provided with a handle 43 and adapted in one position about its axis to engage said rack. The members of the clamp may be adjusted relatively to each other to provide approximately the right length and then by turning said handled worm it is not only brought into locking engagement with the rack, so as to prevent separation of the clamp members, but also, owing to the pitch of its teeth, it serves to draw them tightly together and thus hold the flask securely onto the frame.

Having thus described in detail the various structural features characterizing our improved molding machine the manner of its operation may be briefly set forth.

Figure 1:
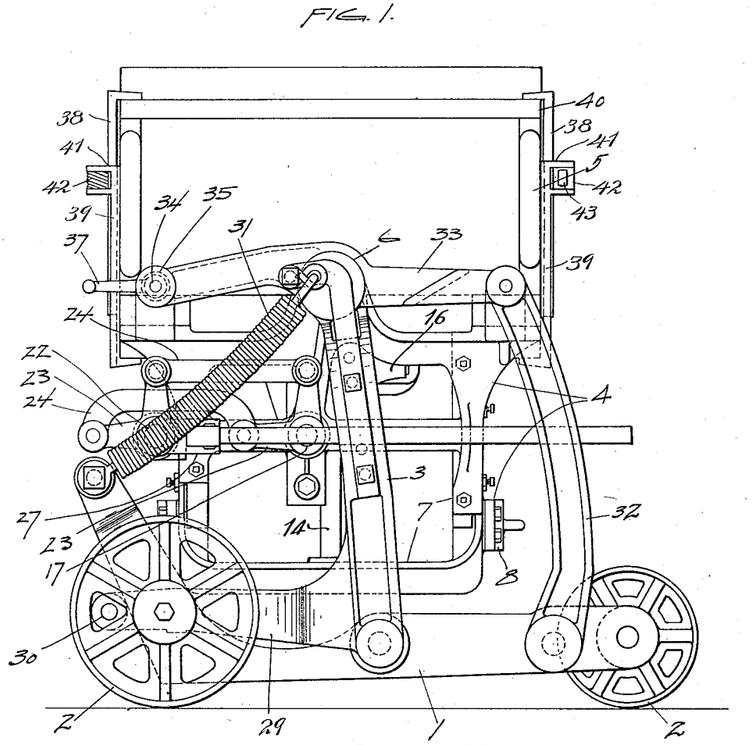
Figure 1 is an end elevation of our improved mold making machine in the normal position of parts, a flask being represented in position on said machine and in the condition it would present after being filled with sand.
Figure 2:
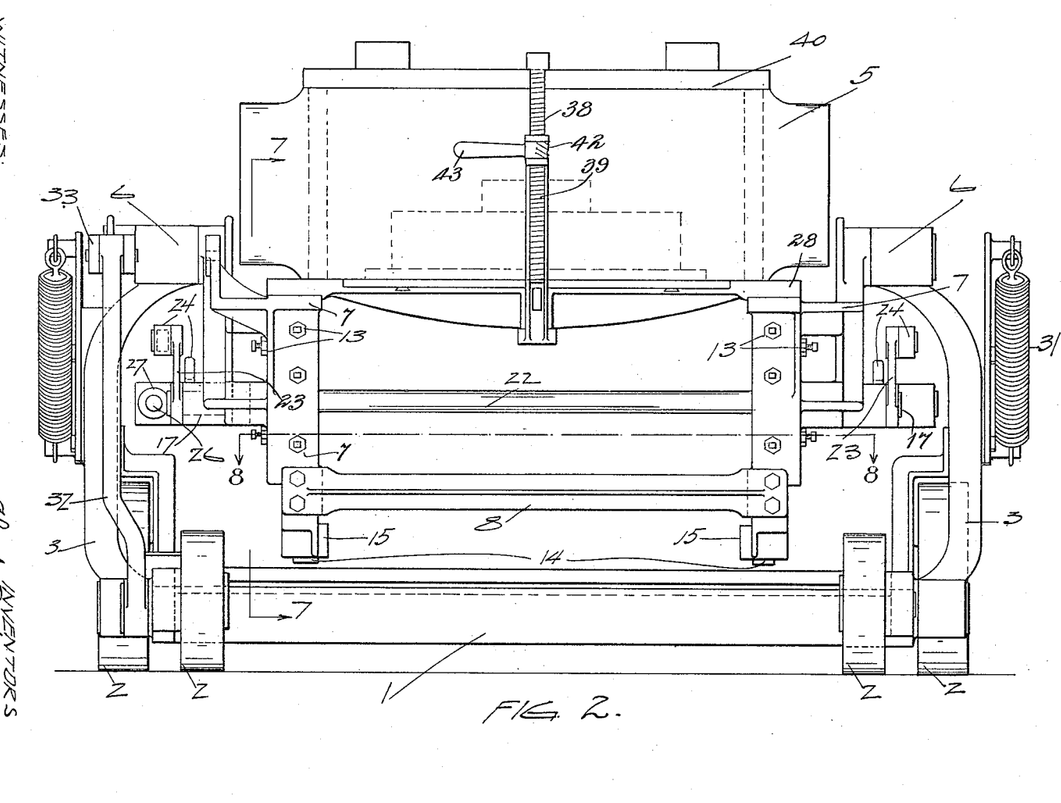
Fig. 2 is a front elevational view of said machine, viewing the same from the right in Fig. 1.
Figure 5:
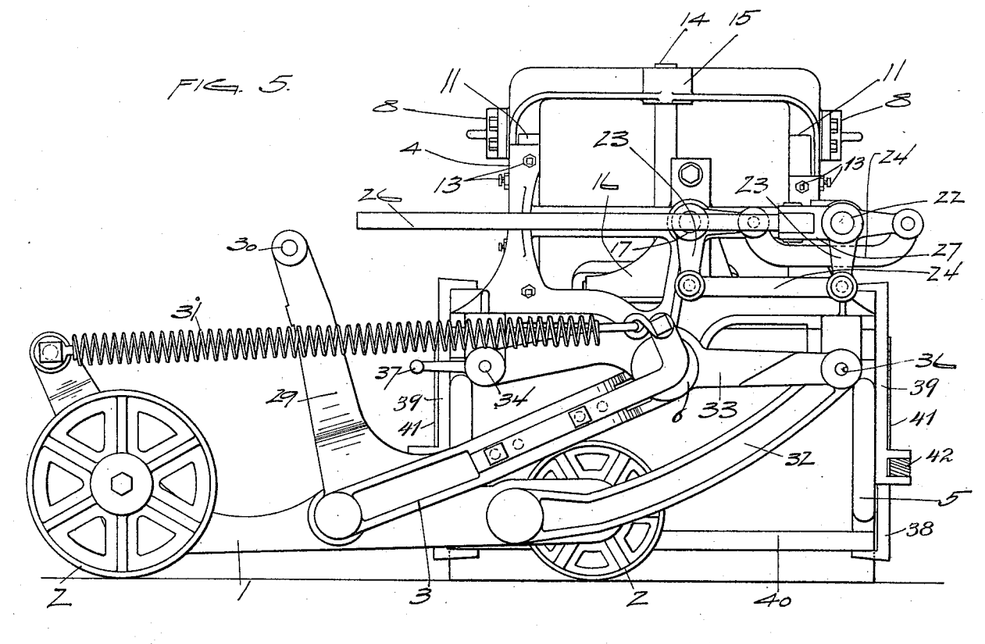
Fig. 5 is again a side elevation of the machine illustrating a third operative position in which the supports for the pattern plate carrier have been rocked down so as to lower the inverted flask onto the floor.
Figure 6:
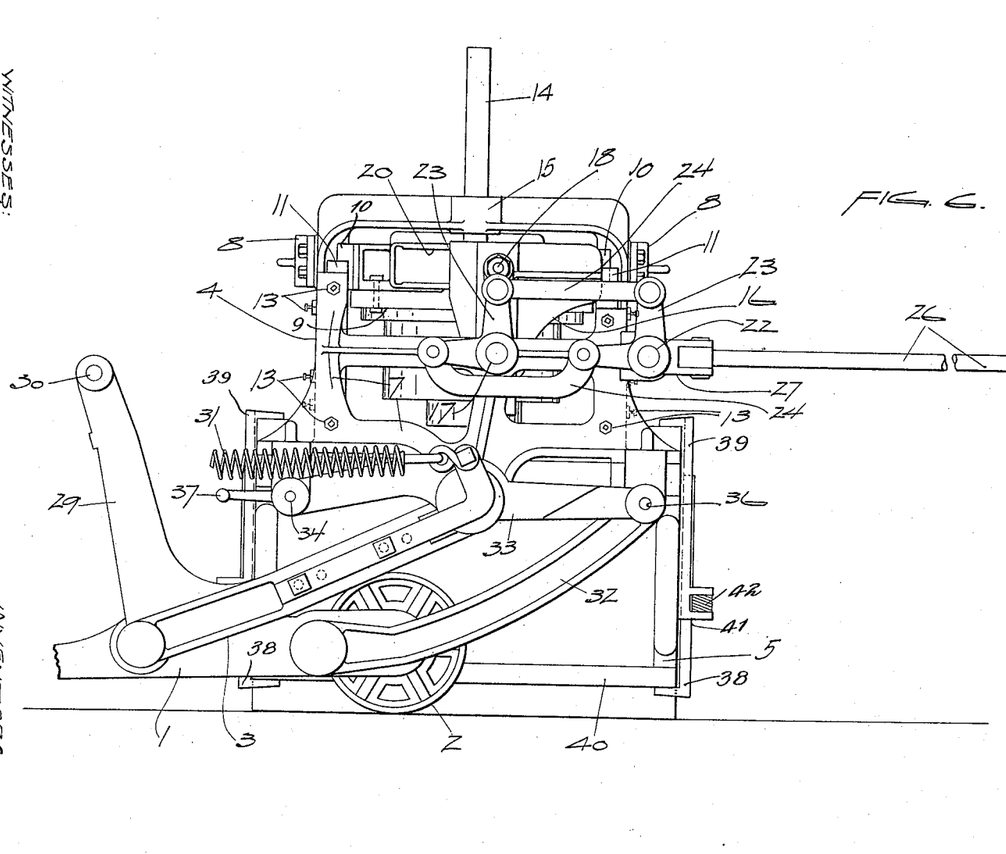
Fig. 6 is a view corresponding to Fig. 5, but showing the pattern plate withdrawn from the mold.
Figure 7:
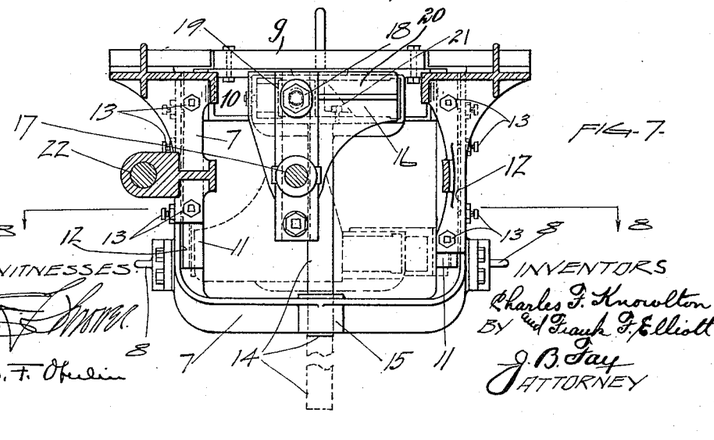
Fig. 7 is a sectional view on line 7—7, Figs. 2 and 3, illustrating a detail of the mechanism for thus withdrawing the pattern plate.

As has been previously explained, Fig. 1 represents what may be called the initial position of the machine, in which the flask is represented as being filled with sand, the bottom board placed thereon, and the whole clamped securely to the frame that holds the pattern plate carrier. The latter of course is in position in register with the face of the frame against which the flask is thus clamped so as to close the flask on its under side as it rests on said frame. The next operation is to invert the frame, with the flask and all, into the position shown in Fig. 4. This is done by the operator directly laying hands onto either the flask or the frame, the parts being so nearly balanced that but little difficulty is experienced in effecting this rollover movement. Prior thereof, of course, locking bolt 34 requires to be withdrawn only however to be thrown into engagement with the opposite corner of the frame, when the latter has been inverted. Thus locked to the arm 33 that is connected with the third rocker-support 32, the frame is pushed forwardly and downwardly by the operator taking hold of the rod 30, as has been already explained. The result of this operation is to lower the flask onto the floor as illustrated in Fig. 5. Next the pattern plate, with the attached pattern, is withdrawn from the sand in the flask by actuation of the hand-lever 26 on the shaft 22 that is connected to operate the crank 16 at each end of the frame. This operation, after the pattern has been finally withdrawn, is illustrated in Fig. 6. It will be noted that the clamps that secure the flask to the frame are still in place, for they are thus maintained pending such "pattern drawing" operation. It accordingly is unnecessary to take any pains to accurately level the flask preparatory to drawing the pattern, inasmuch as an accurate, straight draw is insured, even though the floor onto which the flask has been deposited is irregular.

Preferably the flask will be deposited on the earth or sand which usually constitute the floor of a foundry, so that it may be approximately leveled up and not be distorted by settling too unevenly when the clamps are finally removed, as they are, as soon as the drawing operation is completed. Upon such completion and release of the mold the rocking arms are restored to their normal vertical position by the action of the tension springs 31, the pattern plate is brought flush with the face of the frame and the latter rolled over into position to receive a fresh flask. Before filling such flask, or at least before depositing the same after it has been filled, the machine is rolled along the floor a sufficient distance to allow the flask to be lowered clear of the previously deposited flask.

It is contemplated that in operation the machine may be moved to follow the retreating sand pile and leave a line of finished molds behind, thus eliminating all unnecessary handling of either the sand or the molds, and in this way contributing materially to the saving of labor.

The various other operative advantages of the machine should be sufficiently apparent from the foregoing general description, without being especially adverted to here.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a machine of the character described, the combination of a support oscillatory from a vertical to a substantially horizontal position; a frame oscillatorily mounted on said support about a horizontal axis; and a pattern carrier movable in said frame in a direction transverse of such axis.

2. In a machine of the character described, the combination of a pair of rocking arms oscillatory from a vertical to a substantially horizontal position; and a pattern carrier oscillatorily mounted between said arms about a horizontal axis.

3. In a machine of the character described, the combination of a pair of rocking arms oscillatory from a vertical to a substantially horizontal position; a pattern carrier oscillatorily mounted between said arms about a horizontal axis; and a third arm parallel with the aforesaid arms, adapted to be connected with said carrier to prevent oscillation of the same pending oscillation of said arms.

4. In a machine of the character described, the combination of a pair of rocking arms oscillatory from a vertical to a substantially horizontal position; a pattern carrier oscillatorily mounted between said arms about a horizontal axis; and means adapted to hold said pattern carrier against movement about its axis pending oscillation of said arms, said means including a third rocking arm parallel with the aforesaid pair of arms and means adapted to connect said third arm with said carrier to one side of its axis.

5. In a machine of the character described, the combination of a pair of rocking arms oscillatory from a vertical to a substantially horizontal position; a pattern carrier oscillatorily mounted between said arms about a horizontal axis; and means adapted to hold said pattern carrier against movement about its axis pending oscillation of said arms, said means including a third rocking arm parallel with the aforesaid pair of arms and means adapted to connect said third arm with said carrier to either side of its axis as desired.

6. In a machine of the character described, the combination of a pair of rocking arms oscillatory from a vertical to a substantially horizontal position; a frame oscillatorily mounted between said arms about a horizontal axis; and a pattern carrier movable in said frame in a direction transverse of such axis.

7. In a machine of the character described, the combination of a pair of rocking arms oscillatory from a vertical to a substantially horizontal position; a frame oscillatorily mounted between said arms about a horizontal axis; a pattern carrier movable in said frame in a direction transverse of such axis; and means adapted to maintain said frame against movement about its axis pending oscillation of said axis.

8. In a machine of the character described, the combination of a pair of rocking arms oscillatory from a vertical to a substantially horizontal position; a frame oscillatorily mounted between said arms about a horizontal axis; a pattern carrier movable in said frame in a direction transverse of such axis; and means adapted to maintain said frame against movement about its axis pending oscillation of said arms, said means including a third rocking arm parallel with the aforesaid pair of arms and means adapted to connect said third arm with said frame to one side of its axis.

9. In a machine of the character described, the combination of a pair of rocking arms oscillatory from a vertical to a substantially horizontal position; a frame oscillatorily mounted between said arms about a horizontal axis; a pattern carrier movable in said frame in a direction transverse of such axis; and means adapted to maintain said frame against movement about its axis pending oscillation of said arms, said means including a third rocking arm parallel with the aforesaid pair of arms and means adapted to connect said third arm with said frame to either side of its axis.

10. In a machine of the character described, the combination of a support oscillatory from a vertical to a substantially horizontal position; means for controlling such movement of said support; and a pattern carrier oscillatorily mounted on said support.

11. In a machine of the character described, the combination of a support oscillatory from a vertical to a substantially horizontal position; resilient means for controlling such movement of said support; and a pattern carrier oscillatorily mounted on said support.

12. In a machine of the character described, the combination of a support oscillatory from a vertical to a substantially horizontal position; a tension spring tending to restrain such movement of said support; and a pattern carrier oscillatorily mounted on said support.

13. In a machine of the character described, the combination of the machine base; a pair of rocking arms pivoted on said base about a common axis and oscillatory from a vertical to a substantially horizontal position; a pattern carrier oscillatorily mounted between said arms about a horizontal axis, the center of gravity of said arms and carrier in the vertical position of said arms lying to one side of their pivotal axis; and a stop adapted to retain said arms in such vertical position.

14. In a machine of the character described, the combination of the machine base; a pair of rocking arms pivoted on said base about a common axis and oscillatory from a vertical to a substantially horizontal position; a pattern carrier oscillatorily mounted between said arms about a horizontal axis, the center of gravity of said arms and carrier in the vertical position of said arms lying to one side of their pivotal axis; a stop adapted to retain said arms in such vertical position; and means for controlling the movement of said arms from vertical to horizontal position.

15. In a machine of the character described, the combination of the machine base; a pair of rocking arms pivoted on said base about a common axis and oscillatory from a vertical to a substantially horizontal position; a pattern carrier oscillatorily mounted between said arms about a horizontal axis, the center of gravity of said arms and carrier in the vertical position of said arms lying to one side of their pivotal axis; a stop adapted to retain said arms in such vertical position; and tension springs connecting said arms with said base and tending to retain movement of said arms from vertical to horizontal position.

16. In a machine of the character described, the combination of the machine base; a pair of rocking arms pivoted in said base about a common axis and oscillatory from a vertical to a substantially horizontal position; a frame oscillatorily mounted between said arms about a horizontal axis; and a pattern carrier slidably held in said frame so as to be movable in a direction transverse of such axis.

17. In a machine of the character described, the combination of the machine base; a pair of rocking arms pivoted in said base about a common axis and oscillatory from a vertical to a substantially horizontal position; a frame oscillatorily mounted between said arms about a horizontal axis; a pattern carrier slidably held in said frame so as to be movable in a direction transverse of such axis; and means, mounted on said frame, adapted to position said carrier therein.

18. In a machine of the character described, the combination of the machine base; a pair of rocking arms pivoted in said base about a common axis and oscillatory from a vertical to a substantially horizontal position; a frame oscillatorily mounted between said arms about a horizontal axis; a pattern carrier slidably held in said frame so as to be movable in a direction transverse of such axis; and means, mounted on said frame, adapted to position said carrier therein, said means including a crank having eccentric engagement with said carrier.

19. In a machine of the character described, the combination of the machine base; a pair of rocking arms pivoted on said base about a common axis and oscillatory from a vertical to a substantially horizontal position; a frame oscillatorily mounted between said arms about a horizontal axis; a pattern carrier slidably held at opposite ends in said frame so as to be movable in a direction transverse of such axis; and two operatively connected cranks mounted in said frame, one at each end of said carrier, and eccentrically connected with the latter.

20. In a machine of the character described, the combination of the machine base; a pair of rocking arms pivoted on said base about a common axis and oscillatory from a vertical to a substantially horizontal position; a frame oscillatorily mounted between said arms about a horizontal axis; a pattern carrier slidably held at opposite ends in said frame so as to be movable in a direction transverse of such axis; two cranks mounted in said frame, one at each end of said carrier, and eccentrically connected with the latter; a shaft journaled in said frame to one side of said carrier; and operative connections between said shaft and cranks, respectively.

21. In a machine of the character described, the combination of a machine base; a pair of rocking arms pivoted on said base about a common axis and oscillatory from a vertical to a substantially horizontal position; a frame oscillatorily mounted between said arms about a horizontal axis; a pattern carrier slidably held at opposite ends in said frame so as to be movable in a direction transverse of such axis; two cranks mounted in said frame, one at each end of said carrier, and eccentrically connected with the latter, a shaft journaled in said frame to one side of said carrier; and operative connections between said shaft and cranks, respectively, said connections including a plurality of links and bell-crank levers.

22. In a machine of the character described, the combination of a machine base; a pair of rocking arms pivoted on said base about a common axis and oscillatory from a vertical to a substantially horizontal position; a frame oscillatorily mounted between said arms about a horizontal axis; a pattern carrier slidably held at opposite ends in said frame so as to be movable in a direction transverse of such axis; two cranks mounted in said frame, one at each end of said carrier, and eccentrically connected with the latter, a shaft journaled in said frame to one side of said carrier; and operative connections between said shafts and cranks, respectively, said connections including a bell-crank lever mounted on either end of said shaft, other bell-crank levers mounted on said cranks and links connecting said bell crank levers on said shaft with said bell-crank levers on said cranks.

23. In a machine of the character described, the combination of a suitable base; a pair of rocking arms pivoted on said base about a common axis and oscillatory from a vertical to a substantially horizontal position; a frame oscillatorily mounted between said arms about a horizontal axis; a pattern carrier slidably held in said frame so as to be movable in a direction transverse of such axis, the center of gravity of said arms, said frame and said pattern carrier in the vertical position of said arms lying to one side of the pivotal axis of said arms; and a stop adapted to retain said arms in such vertical position.

24. In a machine of the character described, the combination of a suitable base; a pair of rocking arms pivoted on said base about a common axis and oscillatory from a vertical to a substantially horizontal position; a frame oscillatorily mounted between said arms about a horizontal axis; a pattern carrier slidably held in said frame so as to be movable in a direction transverse of such axis, the center of gravity of said arms, said frame and said pattern carrier in the vertical position of said arms lying to one side of the pivotal axis of said arms; a stop adapted to retain said arms in such vertical position; and resilient means for controlling the movement of said arms from the vertical to the horizontal position.

25. In a machine of the character described a pair of rocking arms oscillatory from a vertical to a substantially horizontal position; a frame oscillatorily mounted between said arms about a horizontal axis; a pattern carrier slidably held in said frame so as to be movable in a direction transverse of such axis; means mounted on said frame for positioning said carrier, the center of gravity of said arms, said frame and said carrier and said means in the vertical position of said arms lying to one side of the pivotal axis of said arms; and a stop adapted to retain said arms in their vertical position.

26. In a machine of the character described, a pair of rocking arms oscillatory from a vertical to a substantially horizontal position; a frame oscillatorily mounted between said arms about a horizontal axis; a pattern carrier slidably held in said frame so as to be movable in a direction transverse of such axis; means mounted on said frame for positioning said carrier, the center of gravity of said arms, said frame and said carrier and said means in the vertical position of said arms lying to one side of the pivotal axis of said arms; a stop adapted to retain said arms in their vertical position; and resilient means for controlling the movement of said arms from their vertical to their horizontal position.

27. In a machine of the character described, the combination of a support oscillatory from a vertical to a substantially horizontal position; a frame oscillatorily mounted on said support about a horizontal axis; a pattern carrier slidably held in said frame so as to be movable in a direction transverse of such axis; alined stub-shafts attached to said frame; connections between said stub-shafts and said carrier; and means adapted to simultaneously oscillate said stub-shafts, thereby positioning said carrier.

28. In a machine of the character described, the combination of a support oscillatory from a vertical to a substantially horizontal position; a frame oscillatorily mounted on said support about a horizontal axis; a pattern carrier slidably held in said frame so as to be movable in a direction transverse of such axis; alined stub-shafts attached to said frame; a bell-crank lever connected to each of said stub-shafts; and means adapted to simultaneously oscillate said levers, thereby positioning said carrier.

29. In a machine of the character described, the combination of a support oscillatory from a vertical to a substantially horizontal position; a frame oscillatorily mounted on said support about a horizontal axis; a pattern carrier slidably held in said frame so as to be movable in a direction transverse of such axis; alined stub-shafts attached to said frame; a bell-crank lever connected to each of said stub-shafts; a shaft rotatably mounted at one end of said frame; means adapted to rotate the same; and other means operated by said shaft and adapted to simultaneously oscillate said bell-crank levers thereby positioning said carrier.

30. In a machine of the character described, the combination of a support oscillatory from a vertical to a substantially horizontal position; a frame oscillatorily mounted on said support about a horizontal axis; a pattern carrier slidably held in said frame so as to be movable in a direction transverse of such axis; alined stub-shafts attached to said frame; a bell-crank lever connected to each of said stub-shafts; a shaft rotatably mounted at one end of said frame; a handle adapted to rotate the same; and links attached to said shaft and said bell-crank levers and adapted to produce simultaneous oscillation of said stub-shafts upon rotation of said last named shaft, thereby positioning said carrier.

31. In a machine of the character described, the combination of a support oscillatory from a vertical to a substantially horizontal position; a frame oscillatorily mounted on said support about a horizontal axis; a pattern carrier slidably held in said frame so as to be movable in a direction transverse of such axis; alined stub-shafts attached to said frame; a bell-crank lever connected to each of said stub-shafts; a shaft rotatably mounted at one end of said frame; a handle adapted to rotate the same; other bell-crank levers attached to said last named shaft; and links connecting the ends of such two bell-crank levers on either side of said frame, whereby oscillation of said last-named shaft produces simultaneous oscillation of said two stub-shafts, thereby positioning said carrier.

Signed by us this 4th day of May, 1911.

CHARLES F. KNOWLTON.
FRANK F. ELLIOTT.

Attested by—
L. H. McCabe,
H. H. McCabe.

Copies of this patent may be obtained for five cents each, by addressing the "Commissioner of Patents, Washington, D. C."